United States Patent [19]

Arai et al.

[11] Patent Number: 5,734,750
[45] Date of Patent: Mar. 31, 1998

[54] CHARACTER RECOGNITION METHOD AND APPARATUS

[75] Inventors: Tsunekazu Arai, Tama; Katsuhiko Sakaguchi, Kawasaki; Shigeki Mori, Koshigaya; Kazuhiro Matsubayashi, Yokohama, all of Japan

[73] Assignee: Canon Kabushiki Kaisha, Tokyo, Japan

[21] Appl. No.: 390,275

[22] Filed: Feb. 15, 1995

Related U.S. Application Data

[63] Continuation of Ser. No. 960,835, Oct. 14, 1992, abandoned.

[30] Foreign Application Priority Data

Oct. 16, 1991 [JP] Japan ................................ 3-267378

[51] Int. Cl.$^6$ ........................... G06K 9/00; G06K 9/46
[52] U.S. Cl. ........................... 382/202; 382/187; 382/197
[58] Field of Search ........................... 382/185, 187, 382/202, 119, 224, 209, 197, 186, 198, 203

[56] References Cited

U.S. PATENT DOCUMENTS

| | | | |
|---|---|---|---|
| 4,173,753 | 11/1979 | Chou | 382/24 |
| 4,317,109 | 2/1982 | Odaka et al. | 382/13 |
| 4,685,142 | 8/1987 | Ooi et al. | 382/24 |
| 4,718,102 | 1/1988 | Crane et al. | 382/24 |
| 5,034,989 | 7/1991 | Loh | 382/13 |
| 5,113,452 | 5/1992 | Chatani et al. | 382/13 |
| 5,303,311 | 4/1994 | Epting et al. | 382/197 |
| 5,579,408 | 11/1996 | Sakaguchi et al. | 382/187 |

FOREIGN PATENT DOCUMENTS

| | | | |
|---|---|---|---|
| 58-2984 | 1/1983 | Japan | 382/24 |
| 3175591 | 7/1991 | Japan. | |

OTHER PUBLICATIONS

Nakagawa, et al., "On-line Recognition of Handwritten Japanese Characters in Jolis-1", International Association for Pattern Recognition, pp. 776-779 (1982).

Yoshida, et al. "Online Handwritten Character Recognition for a Personal Computer System", IEEE Transactins on Consumer electronics, vol. CE-28, No. 3, pp. 202-208 (1982).

Juang, "On Line Recognition of Handwritten Chinese Characters: A Syntactic-Semantic Approach", Proceedings TENCON '87, vol. 1/3, pp. 91-95 (1987).

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

A character recognition apparatus and method for recognizing an unknown character by comparing strokes of the input character with stroke information stored in a dictionary. Each stroke of the input character is classified into one of plural categories according to stroke direction. The classified input strokes are rearranged into groups of strokes having the same classification. The degree of analogy between rearranged input strokes and stroke information stored in the dictionary for each group of similarly classified stroke group is calculated based on stroke length, and a maximum analogous element for each input stroke according to the calculated degree of analogy is detected. The detected maximum analogous elements are summed together, and the character whose sum is maximum is output as the identity of the unknown input character.

22 Claims, 7 Drawing Sheets

CHARACTER RECOGNITION METHOD AND APPARATUS

This application is a continuation of application Ser. No. 07/960,835 filed Oct. 14, 1992, now abandoned.

BACKGROUND OF THE INVENTION

1. Field of the Invention

This invention relates to a character recognition method and apparatus for recognizing an unknown input character by comparing input strokes of the input character with strokes of dictionary data.

2. Description of the Related Art

Character recognition methods are multistep processes for comparing an unknown character pattern to standard character patterns stored in a collated dictionary. First, one of the standard patterns which has the same number of strokes as the unknown character pattern is selected. Then, the degree of analogy between each stroke of the unknown character pattern and each stroke of the selected standard pattern is calculated, for example, by evaluating normalized positional coordinates of the start point and the end point of each stroke. Then, an analogy matrix whose elements comprise the calculated degrees of analogy is obtained. The maximum value in each column of the analogy matrix is detected, and the rows of the analogy matrix are then inspected to determine whether or not there is only a single maximum matrix element in each row. If the result of the determination is positive, the maximum matrix elements in all the rows are added and the sum is stored as a first result of addition. If the result of the determination is negative, a small matrix is formed by extracting rows from the analogy matrix where two or more maximum matrix elements are present. Elements from the small matrix are selected such that only one element is selected from each row of the small matrix. The above-described maximum matrix elements are again selected from all the rows and columns of the analogy matrix except those elements constituting the small matrix, and the maximum of all the rows are added to the above-described selected small-matrix elements. The sum is stored as a second result of addition.

The above process is repeated for all the standard patterns. All of the first and second results of addition are inspected to determine which one is the maximum, and standard-pattern information corresponding to the maximum is output as the identity of the unknown character.

In the above-described conventional approach, however, since all strokes of an unknown character are compared with all strokes of many standard patterns, a large amount of calculation is required for calculating the matrices of analogy between strokes.

Moreover, since matrices of analogy between strokes are obtained for all of the standard character patterns which have the same number of strokes as an unknown character pattern (for example, if a character 兆 is input, all characters having eight strokes, such as 卒, 숓 and the like), a large amount of calculation is required, and much time is needed for a recognition operation. And, even though the standard character patterns that are compared to the unknown character pattern are limited to those standard character patterns having the same number of strokes, the number of compared character patterns is still rather large. Accordingly, unknown character patterns are mis-identified frequently.

SUMMARY OF THE INVENTION

The present invention provides a character recognition method and apparatus for recognizing an input character by comparing strokes of the input character with stroke information stored in a dictionary.

According to one aspect of the present invention, a character recognition apparatus comprises an input-stroke classifier for classifying each stroke of an input character into one of a plurality of different classifications, and a rearranger for rearranging the classified input strokes into groups of strokes which have the same classification. A detector calculates a degree of an analogy between rearranged input strokes and stroke information stored in the dictionary for each group of similarly classified strokes, and detects a maximum analogous element for each input stroke according to the calculated degree of analogy. The detected maximum analogous elements are added and a character whose sum of maximum analogous elements is maximum is output.

According to another aspect of the invention, a character recognition method comprises the steps of classifying each stroke of an input character into one of a plurality of different classifications, and rearranging the classified input strokes into groups of strokes which have the same classification. A calculating step calculates a degree of analogy between rearranged input strokes and stroke information stored in the dictionary for each group of similarly classified strokes, and detects a maximum analogous element for each input stroke according to the calculated degree of analogy. The detected maximum analogous elements are added and a character whose sum of maximum analogous elements is maximum is output.

Objectives and advantages in addition to those discussed above shall be apparent to those skilled in the art from the description of the preferred embodiment of the invention which follows. In the description, reference is made to the accompanying drawings, Which form a part hereof, and which illustrate an example of the invention. Such example, however, is not exhaustive of the various embodiments of the invention, and therefore reference is made to the appended claims for determining the scope of the invention.

DESCRIPTION OF THE PREFERRED EMBODIMENTS

First Embodiment

Figure 1:
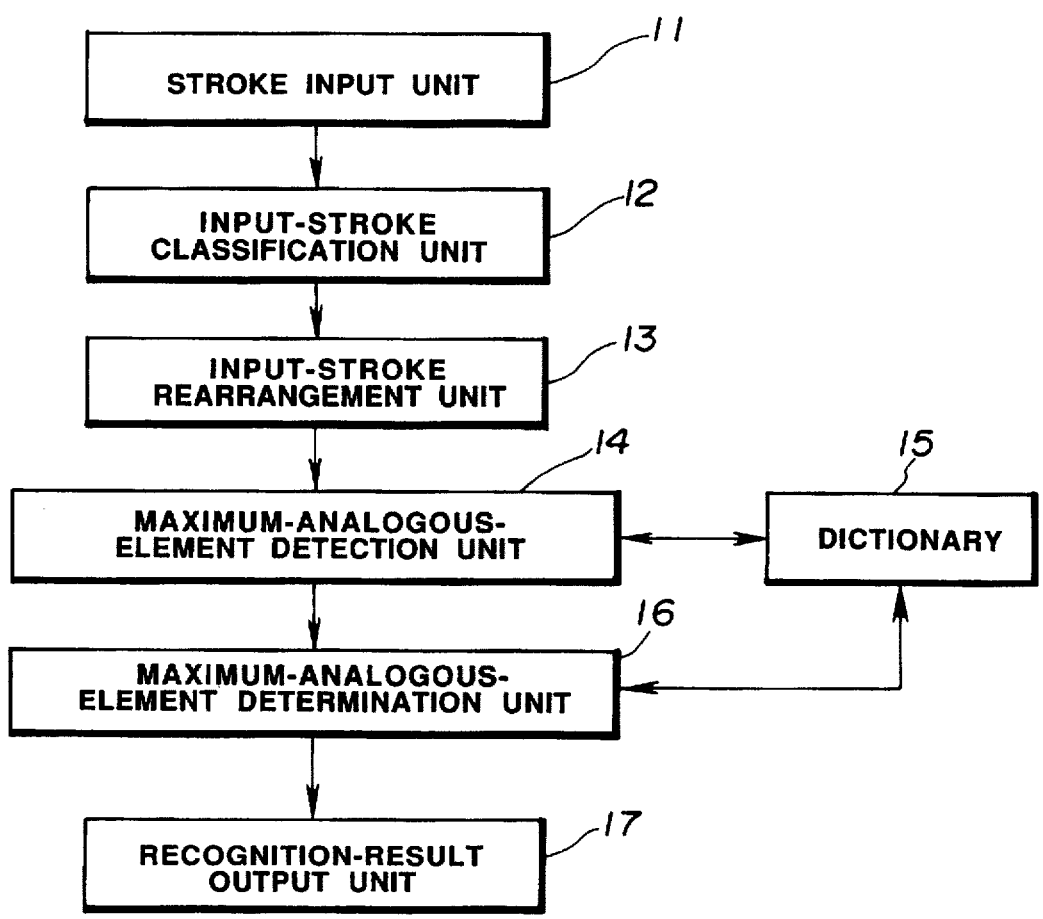
FIG. 1 is a block diagram showing the functional configuration of a character recognition apparatus according to a first embodiment of the present invention.

FIG. 1 is a block diagram showing the functional configuration of a character recognition apparatus according to a first embodiment of the present invention. In FIG. 1, stroke input unit 11, comprising a conventional digitizer or the like, inputs input strokes in the form of coordinate data. Input-stroke classification unit 12 classifies the input strokes input from stroke input unit 11 into nine classifications, i.e., eight vectors and a point, according to the length and direction of a directional vector obtained by connecting the start point and the end point of each of the input strokes. Input-stroke rearrangement unit 13 rearranges the input strokes classified by input-stroke classification unit 12 for each group of the same classification, such as stroke data of classification 1, stroke data of classification 2, and the like, in accordance with the classification performed by the input-stroke classification unit 12 irrespective of the input sequence of the strokes. Maximum-analogous-element detection unit 14 calculates the degree of analogy between each of the input strokes and a standard stroke stored in dictionary 15, forms an analogy matrix using the calculated degrees of analogy, and detects the maximum analogous element in each column of the matrix of analogy between strokes of the same classification. Dictionary 15 arranges standard-stroke data in units of a character for strokes of the same classification in accordance with the above-described classification of strokes. Maximum-analogous-element determination unit 16 determines whether or not the maximum analogous element detected by maximum-analogous-element detection unit 14 is unique in each row. If the result of the determination is negative, an element selected from among a plurality of analogous elements present in the row according to the sequence of the data stored in dictionary 15 is made to be the maximum analogous element in the row. Recognition-result output unit 17 adds the maximum analogous elements for each character detected by comparison with dictionary 15, and outputs the character pattern stored in dictionary 15 for which the result of the addition has the maximum value as the result of recognition.

Figure 2:
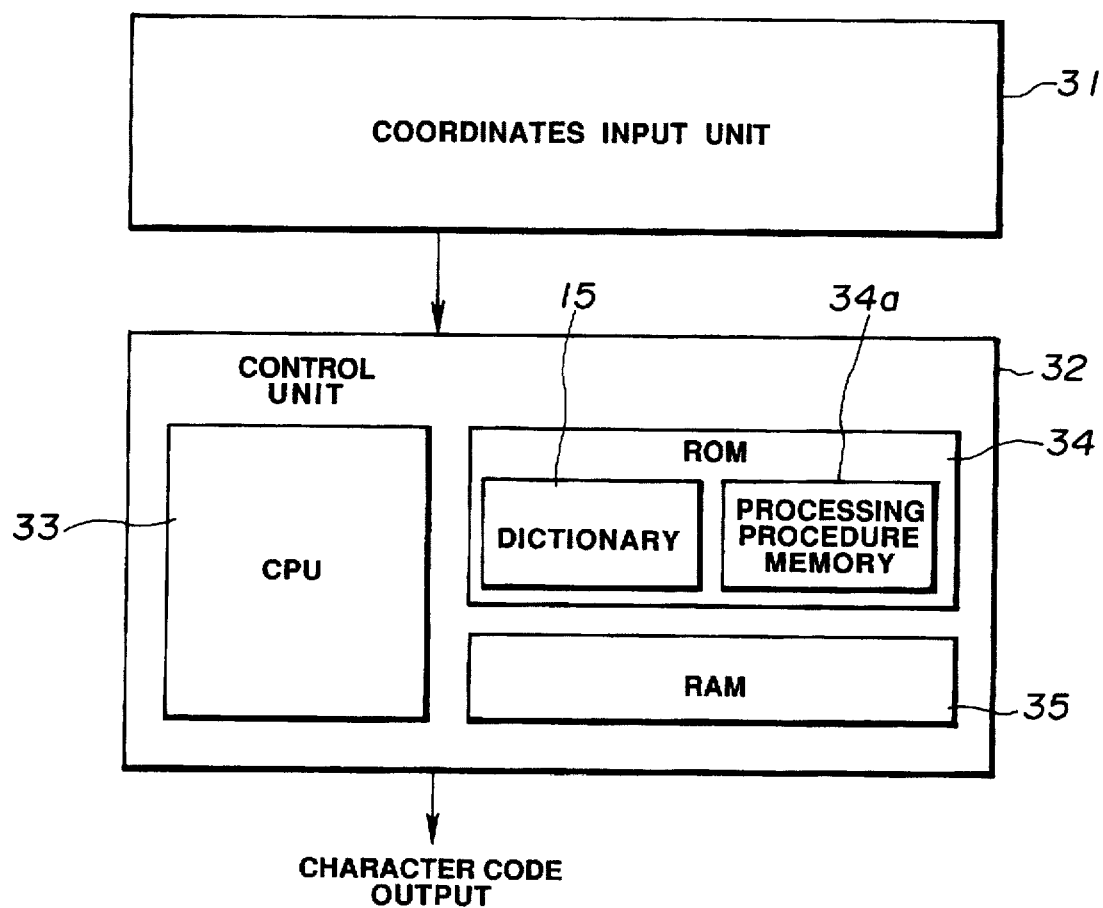
FIG. 2 is a block diagram showing the schematic configuration of the character recognition apparatus of the first embodiment.

FIG. 2 is a block diagram showing the schematic configuration of the character recognition apparatus of the present embodiment. In FIG. 2, coordinate input unit 31, comprising a conventional digitizer or the like, inputs input strokes in the form of coordinate data. When input of one character has been completed, coordinate data for the character are transmitted to control unit 32 in the sequence of input. Control unit 32 comprises CPU (central processing unit) 33 for executing processing, ROM (read-only memory) 34 for storing the dictionary (having the structure of dictionary data shown in FIG. 5 (to be described later)), and for storing processing procedure 34a (the flowchart shown in FIG. 8 (to be described later)) and the like, and a RAM (random access memory) 35 for storing input stroke data and the like. CPU 33 processes input strokes in accordance with processing procedure 34a stored in the ROM 34, recognizes the hand-written input character by comparing the character's strokes with standard strokes in dictionary 15 stored in ROM 34, and outputs a character code which is the result of the recognition.

Figure 3:
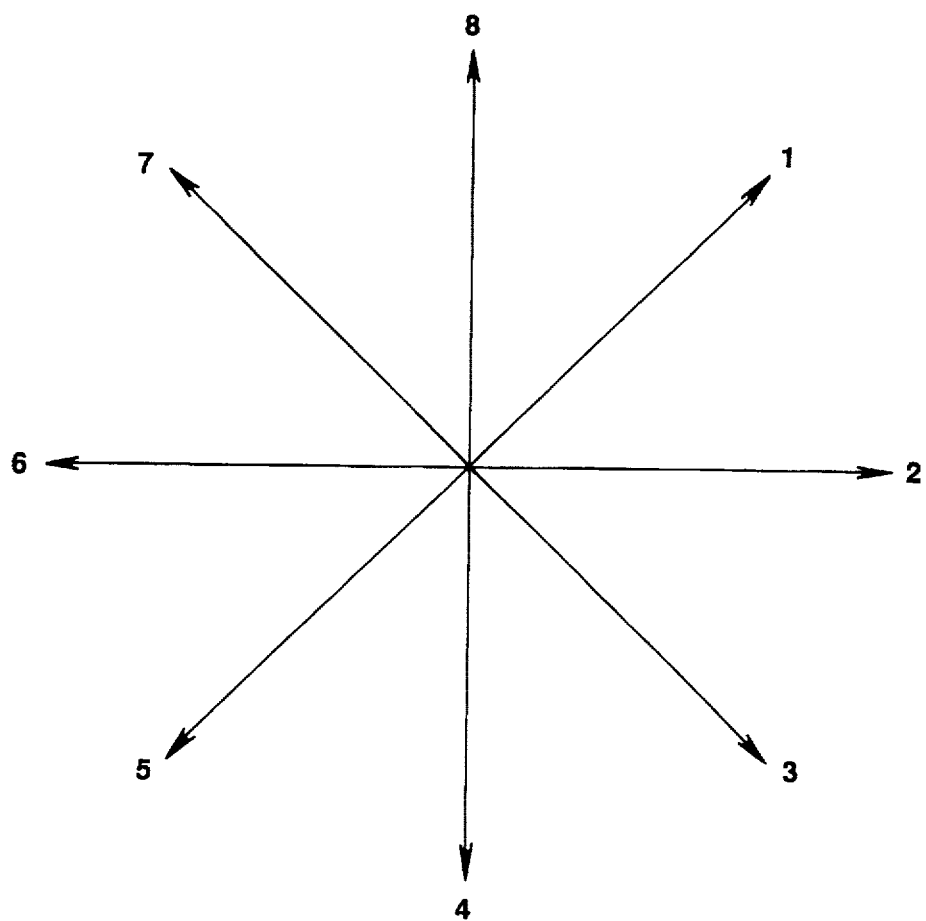
FIG. 3 is a diagram illustrating vectors in eight directions as an example of stroke vectors classified by an input-stroke classification unit.

FIG. 3 is a diagram illustrating vectors in eight directions as an example of classification of stroke vectors classified by the input-stroke classification unit 12 shown in FIG. 1.

Figure 4:
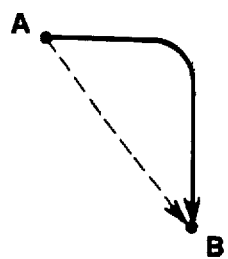
FIG. 4 is a diagram illustrating a directional vector obtained by connecting the start point and the end point of an input stroke.

FIG. 4 is a diagram illustrating a directional vector obtained by connecting the start point and the end point of an input stroke. When a stroke indicated by a solid line, having point A as the start point and point B as the end point, is input, a broken line connecting points A and B is considered to be the directional vector of the stroke. Referring to FIG. 3, this stroke equals the stroke of directional vector 3. If the length of the stroke from point A to point B is less than a predetermined length, as in the case of a voiced sound signal in a Japanese character, directional vector 9 is assigned for the stroke since the direction of the stroke is unstable.

Figure 5:
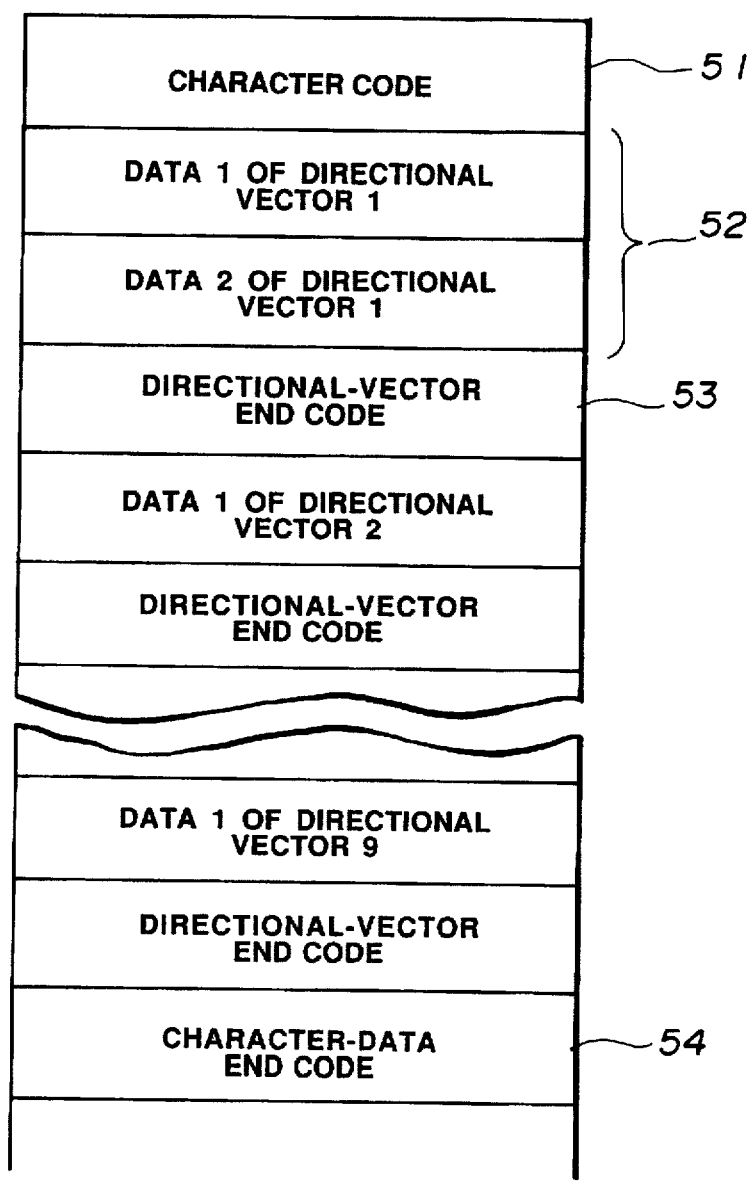
FIG. 5 is a diagram showing the structure of stroke data stored in the dictionary 15 shown in FIGS. 1 and 2.

FIG. 5 is a diagram showing the structure of stroke data stored in the dictionary 15. In FIG. 5, the structure of data for one character of the dictionary 15 stored within ROM 34 is illustrated. At the head, character code 51 which represents the identity of the character is present. Next, normalized relative positional coordinate data 52 of the start point and the end point of stroke data of the character classified as directional vector 1 are stored. A directional-vector end code is stored at the end of each of the stroke data classified as directional vector 1. Stroke data classified as directional vector 2 are stored from the next address. In the same manner, vector data are sequentially stored until directional vector 9. Thus, the data for each of the strokes are grouped by directional vectors such that the stroke data for directional vector 1 is grouped together, the stroke data for directional vector 2 is grouped together, etc. The end of the data of the character is indicated by character-data end code 54.

Figure 6:
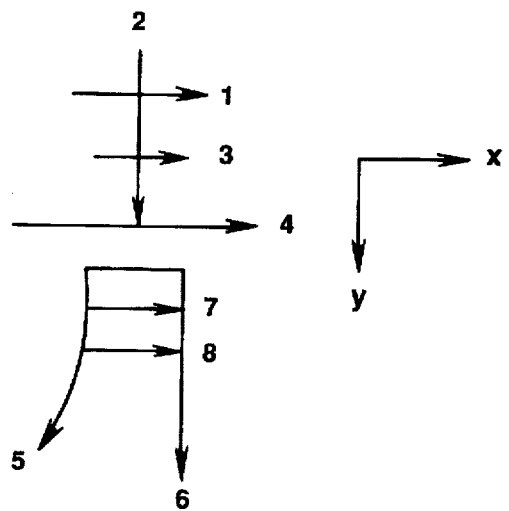
FIG. 6 is a diagram illustrating input strokes when a character "兆" is input by hand writing.

FIG. 6 is a diagram illustrating an example of input strokes when a character "*" is input by hand writing. A numeral indicated at the side of each stroke represents the sequence of input of the stroke (the sequence of hand writing).

Figure 7:
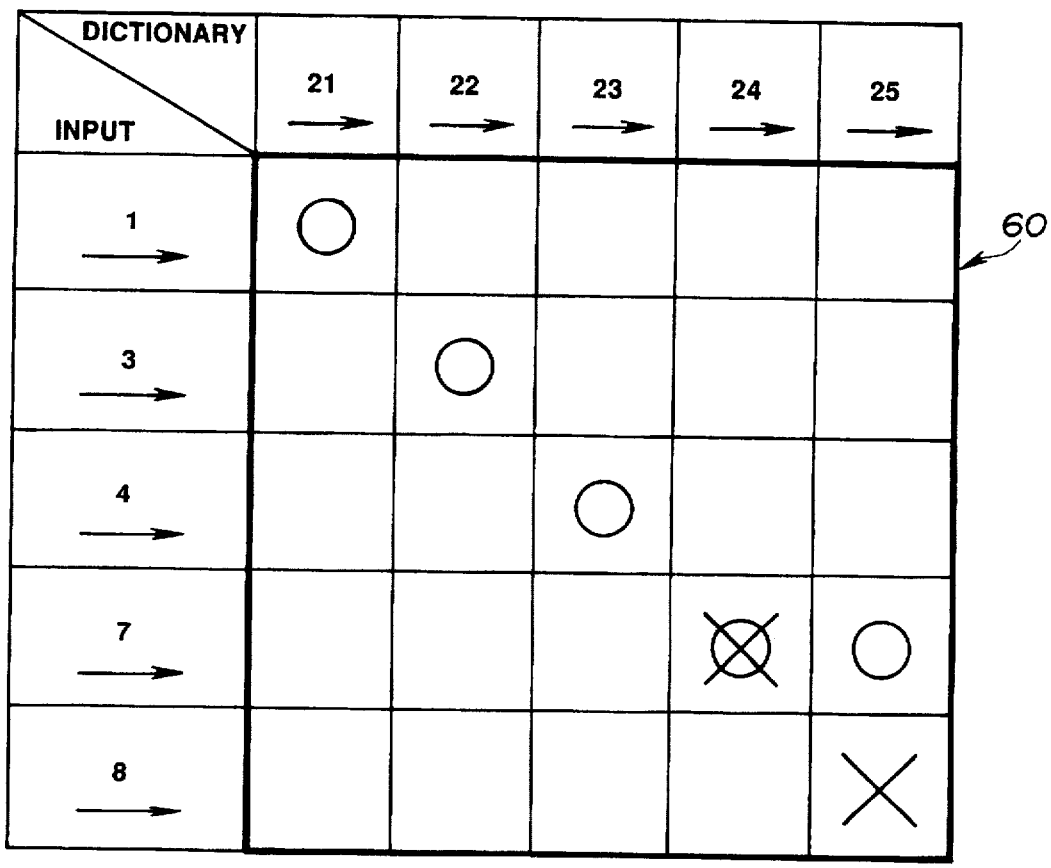
FIG. 7 is a diagram illustrating a matrix of analogy between strokes of directional vector 2 when the character "兆" shown in FIG. 6 is input.

FIG. 7 is a diagram illustrating a matrix of analogy 60, in the direction of directional vector 2, between strokes of an unknown character, here the character "*" shown in FIG. 6 and strokes of a standard pattern in the character dictionary. is input. Numerals 1, 3, 4, 7 and 8 correspond to the stroke numbering shown in FIG. 6 and indicate the sequence of hand writing at the input operation. Numerals 21, 22, 23, 24 and 25 correspond to stroke numbering of the standard pattern, for example, numeral 21 indicates the 1st data of directional vector 2. The symbol ○ represents the maximum analogous element detected in the direction of the column of the matrix. The symbol x represents the maximum analogous element selected by maximum-analogous-element determination unit 16 shown in FIG. 1.

Figure 8:
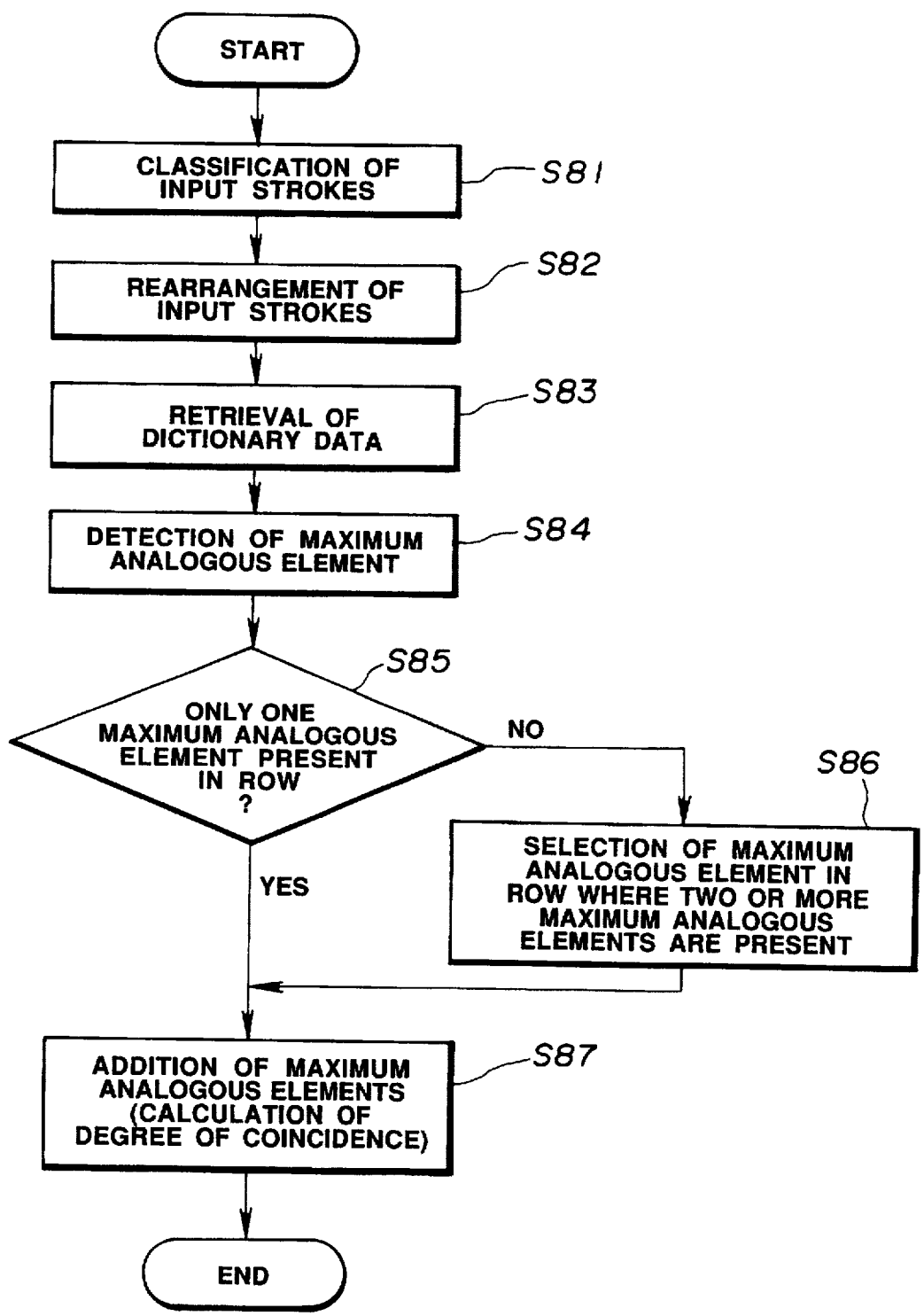
FIG. 8 is a flowchart showing processing procedure of matching between input strokes and one-character strokes stored in a dictionary.

FIG. 8 is a flowchart showing a processing procedure of matching between input strokes and strokes of one character in dictionary 15. An explanation will now be provided of the processing procedure of the present embodiment with reference to the flowchart shown in FIG. 8.

In step S81, classification processing of input strokes is performed. As shown in FIGS. 3 and 4, input strokes are classified into eight directions according to the direction of the directional vector connecting the start point and the end point of an input stroke. When the size of an input stroke is small compared with the size of the entire character and is less than a predetermined value, that is, the input stroke comprises a point or the like, the input stroke is classified as the ninth directional vector. The process then proceeds to step S82.

In step S82, the input strokes are rearranged into groups such that each stroke in a group has the same classification. That is, irrespective of the order in which the strokes were input the input strokes are rearranged in the order of directional vectors. For example, the pattern "✶" shown in FIG. 6 is input in the sequence of numerals indicated at the sides of respective strokes. If these strokes are classified in step S81, strokes 1, 2, 3, 4, 5, 6, 7 and 8 are classified as directional vectors 2, 4, 2, 2, 4, 3, 2 and 2, respectively. The strokes are sequentially arranged from strokes of directional vector 1. In the pattern "✶" shown in FIG. 6, no stroke is classified as directional vector 1. Strokes 1, 3, 4, 7 and 8 are classified as directional vector 2, strokes 2 and 5 are classified as directional vector 4, and stroke 5 is classified as directional vector 4. The strokes are rearranged in accordance with those classifications within each classification, the strokes are ordered in accordance with their location in the x-y plane. For example, in the case of directional vector 2, strokes of the same directional vector are rearranged in the sequence of the y coordinate shown in FIG. 6, i.e., in the sequence of strokes 1, 3, 4, 7 and 8. In the case of directional vector 4, strokes are arranged in the sequence of the x coordinate shown in FIG. 6, i.e., in the sequence of strokes 2 and 5. After rearrangement, the arrangement of strokes is the same as the arrangement of stroke data of a standard character pattern within dictionary 15 shown in FIG. 5.

In step S83, standard patterns in the dictionary data having the same classified numbers of input strokes are retrieved. That is, in the pattern "✶" shown in FIG. 6, no stroke is classified as directional vector 1, five strokes are classified as directional vector 2, one stroke is classified as directional vector 3, two strokes are classified as directional vector 4, and no stroke is classified as directional vectors 5, 6, 7, 8 and 9. Characters having the same classified numbers of strokes stored in dictionary 15 are retrieved. That is, character patterns, in which the number of stroke of directional vector 1 is zero, the number of strokes of directional vector 2 is five, the number of stroke of directional vector 3 is one, the number of strokes of directional vector 4 is two, and the numbers of strokes of directional vectors 5, 6, 7 and 8 are zero, are retrieved.

In steps after step S84, matching processing between the input pattern and the character patterns (standard patterns) of dictionary 15 retrieved in step S83 is performed to obtain the result of recognition. In step S84, processing of detecting the maximum analogous element in each column of the matrix of analogy between strokes is performed for each of the input strokes and strokes of a character pattern of dictionary 15 of the same classification (the same directional vector). That is, the matrix of analogy between strokes of directional vector 2 of the pattern "✶" shown in FIG. 6 is formed as shown at 60 in FIG. 7. In this matrix, the maximum analogous element in the degree of analogy between strokes (evaluated, for example, by normalized positional coordinates of the start point and the end point of each stroke) is detected in each column (in the vertical direction). Thus, strokes having the high degree of analogy are detected as indicated by ○ in FIG. 7. Such processing is also performed for each of the directional vectors, namely, directional vectors 3 and 4 in this example.

The above-described processing is performed for all character data of dictionary 15 retrieved in step S83, and a recognition operation is performed according to the result of the processing.

That is, in step 885, it is determined whether or not the number of maximum analogous elements detected in respective columns in step S84 is unique in each row. If the result of the determination is affirmative, the process proceeds to step S87, where processing of adding the maximum analogous elements is performed. If the result of the determination in step S85 is negative, the process proceeds to step S86, where processing of selecting only one maximum analogous element in each row is performed. That is, when the maximum analogous element indicated by "○" has been detected in each column (in the vertical direction) as shown in FIG. 7, it is checked whether or not only one maximum analogous element indicated by "○" is present in each row. In the case of FIG. 7, only one maximum analogous element is present for input vectors 1, 3 and 4, but two maximum analogous elements are present for input vector 7, and no maximum analogous element is present for input vector 8. Hence, the process proceeds to step S86.

In step S86, the process of selecting the maximum analogous element in a row where two or more maximum analogous elements are present according to the sequence of data of dictionary 15 is performed. Such a case seldom occurs if a character is input in a correct form. However, if the pattern shown in FIG. 6 is input, since strokes 7 and 8 are present at substantially the same position, two strokes representing lower lateral lines of the character "✶" of the dictionary may coincide. As described above, in order to recognize a character, each input stroke must be in the relationship of one-to-one correspondence with respect to each stroke of the character stored in the dictionary. Hence, portions where one-to-one correspondence is not realized (for example, input strokes 7 and 8 and dictionary strokes 24 and 25 in FIG. 7) are extracted, and rearrangement is performed so as to provide one-to-one correspondence. Since the classified input strokes and the strokes stored in dictionary 15 are arranged according to the same method, correspondence between strokes may be performed in the sequence of storage. That is, in the case of FIG. 7, rearrangement is performed so that stroke 7 corresponds to stroke 24, and stroke 8 corresponds to stroke 25. The result of the correspondence is indicated by x in FIG. 7.

In step S87, processing of adding the maximum analogous elements is performed. The maximum analogous elements between all the input strokes and the dictionary strokes obtained in steps S84, S85 and S86 are added. The result of the addition is made to be the degree of coincidence between the input character and the character pattern of the dictionary. The processing from step S84 to step S87 is performed for all the character patterns retrieved in step S83, and the character pattern having the highest degree of coincidence (for which the result of the addition has the largest value) is made to be the result of recognition.

Second Embodiment

Figure 9A:
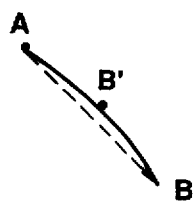
FIGS. 9(a) and 9(b) are diagrams showing examples of input strokes in a second embodiment of the present invention.
Figure 9B:
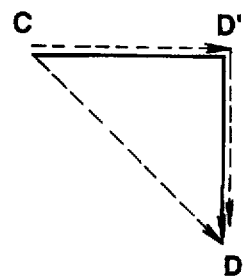

In the above-described first embodiment, the input-stroke classification unit classifies input strokes according to the directional vector connecting the start point and the end point of an input stroke. However, classification may also be performed according to a directional vector obtained by connecting the start point, the middle point and the end point of an input stroke. As shown in FIGS. 9(a) and 9(b), when strokes indicated by solid lines AB and CD are input, the first embodiment classifies the two strokes as the strokes of the same kind, namely directional vector 3, since a stroke is classified according to the directional vector connecting the start point and the end point of the stroke. However, if a stroke is classified according to a directional vector connecting the start point, the middle point and the end point of the stroke, the stroke AB shown in FIG. 9(a) is classified as directional vector 33 comprising A'BB, and the stroke CD shown in FIG. 9(b) is classified as directional vector 24 comprising CD'D. That is, the two strokes are classified as different strokes. While the number of the kinds of classified strokes increases, the number of character patterns retrieved in retrieval of dictionary data (step S83 shown in FIG. 8) decreases. Hence, it is possible to output the result of recognition which is more precise than in the first embodiment.

As explained above, according to the above-described embodiments, by classifying input strokes, rearranging the input strokes into groups having the same classification, and detecting the maximum analogous element in a matrix of analogy between input strokes and dictionary strokes of the same classification, it is possible to reduce the amount of calculation of the matrix of analogy between strokes, and therefore to reduce the time for recognition. In addition, since the number of character patterns of a dictionary to be matched with the input character is limited by classifying input strokes, it is also possible to shorten the time for recognition, and to reduce misrecognition. Moreover, since processing is performed irrespective of the sequence of input strokes of a character to be recognized, the character can be input in a free sequence of strokes or no sequence of strokes, such as when the unknown character is scanned in or received by facsimile transmission.

The present invention may be applied to a system comprising a plurality of units, or to an apparatus comprising a single unit. Furthermore, the present invention may, of course, be applied to a case in which the object of the invention can be achieved by supplying a system or an apparatus with programs for executing a process defined by the invention.

What is claimed is:

1. A character recognition apparatus comprising:

input means for inputting a plurality of strokes which collectively form a character;

input-stroke classification means for classifying each stroke of the input strokes, which are constituent strokes forming the input character, into one of a plurality of different types;

extraction means for extracting input strokes which are classified into one type;

calculating means for calculating a value of analogy between input strokes which are classified as a particular type and stroke information of the particular type for a character stored in a dictionary, for forming an analogy matrix comprising calculated values of analogy as elements thereof, for detecting a maximum matrix element in each of a plurality of columns or in each of a plurality of rows of the analogy matrix, and for designating the detected maximum matrix elements as maximum analogous elements;

determining means for determining whether or not there is one maximum matrix element in each row or each column of the analogy matrix, and in a case that there is more than one maximum matrix element in a row or a column, for selecting a maximum matrix element so that only one maximum matrix element is present in each row or each column;

detection means for detecting a maximum analogous character from a plurality of characters stored in the dictionary according to calculated values of analogy between input strokes classified as a particular type and stroke information of the particular type for each of the plurality of characters stored in the dictionary; and output means for outputting said maximum analogous character.

2. A character recognition apparatus according to claim 1, wherein said input-stroke classification means classifies each stroke based on stroke direction.

3. A character recognition apparatus according to claim 1, further comprising stroke length determining means for determining stroke length of each stroke of the input character, and wherein said detection means calculates degree of analogy based on stroke length.

4. A character recognition apparatus according to claim 1, wherein the dictionary stroke information comprises strokes of a character pattern stored in the dictionary whose number of strokes coincides with the number of strokes of a pattern of the input character for each similarly classified stroke group.

5. A character recognition apparatus according to claim 4, wherein the dictionary has a data structure in which dictionary-stroke information of respective dictionary character patterns are arranged based on said input-stroke classification means.

6. A character recognition apparatus according to claim 1, wherein the dictionary has a data structure in which dictionary-stroke information of respective dictionary character patterns are arranged based on said input-stroke classification means.

7. A character recognition method comprising the steps of:

inputting a plurality of strokes which collectively form a character;

classifying each stroke of the input strokes into one of a plurality of different types;

extracting input strokes which are classified into one type;

calculating a value of analogy between the strokes which are classified as said type and stroke information of said type for a character stored in a dictionary;

forming an analogy matrix comprising calculated values of analogy as elements thereof;

detecting a maximum matrix element in each of a plurality of columns or in each of a plurality of rows of the analogy matrix;

designating the detected maximum matrix elements as maximum analogous elements;

determining whether or not there is one maximum matrix element in each row or each column of the analogy matrix;

selecting a maximum matrix element so that only one maximum matrix element is present in each row or each column, in a case that there is more than one maximum matrix element in a row or column;

detecting a maximum analogous character from a plurality of characters stored in the dictionary according to values of analogy between input strokes classified as a particular type and stroke information of the particular type for each of the plurality of characters stored in the dictionary; and outputting said maximum analogous character.

8. A character recognition method according to claim 7, wherein said input-stroke classification step classifies each stroke based on stroke direction.

9. A character recognition method according to claim 7, further comprising the step of determining stroke length of each stroke of the input character, and wherein said calculating step calculates a value of analogy based on stroke length.

10. A character recognition method according to claim 7, wherein the dictionary stroke information comprises strokes of a character pattern stored in the dictionary whose number of strokes coincides with the number of strokes of a pattern of the input character for each similarly classified stroke group.

11. A character recognition apparatus according to claim 10, wherein the dictionary has a data structure in which dictionary-stroke information of respective dictionary character patterns are arranged based on said classifying step.

12. A character recognition method according to claim 7, wherein the dictionary has a data structure in which dictionary-stroke information of respective dictionary character patterns are arranged based on said classifying step.

13. A character recognition apparatus comprising:

input means for inputting a plurality of strokes constituting a character, the strokes being represented by a direction component and a coordinate position;

rearrangement means for rearranging the input strokes according to a sequence and a position of the input strokes;

calculating means for calculating a one-to-one correspondence value of analogy between input strokes rearranged by said rearrangement means and stroke information stored in the dictionary;

detection means for detecting a maximum analogous character according to the calculated values of analogy; and output means for outputting said maximum analogous character.

14. A character recognition apparatus according to claim 13, further comprising stroke length determining means for determining stroke length of each stroke of the input character, and wherein said calculating means calculates a value of analogy based on stroke length.

15. A character recognition apparatus according to claim 13, further comprising means for determining whether or not there is one maximum analogous element corresponding to each input stroke, and, in a case that there is more than one maximum analogous element corresponding to an input stroke, for selecting an element so that only one maximum analogous element corresponds to each input stroke.

16. A character recognition apparatus according to claim 13, wherein the dictionary has a data structure in which dictionary-stroke information of respective dictionary character patterns are arranged based on said input-stroke classification means and said rearrangement means.

17. A character recognition method comprising the steps of:

inputting a plurality of strokes represented by a direction component and a coordinate position;

rearranging the input strokes according to a sequence and a position of the input strokes;

calculating a one-to-one correspondence value of analogy between input strokes rearranged in said rearrangement step and stroke information stored in the dictionary;

detecting a maximum analogous character according to the calculated values of analogy; and outputting said maximum analogous character.

18. A character recognition method according to claim 17, further comprising the step of determining stroke length of each stroke of the input character, and calculating degree of analogy based on stroke length.

19. A character recognition method according to claim 17, further comprising the step of determining whether or not there is one maximum analogous element corresponding to each input stroke, and, in a case that there is more than one maximum analogous element corresponding to an input stroke, selecting an element so that only one maximum analogous element corresponds to each input stroke.

20. A character recognition method according to claim 17, wherein the dictionary has a data structure in which dictionary-stroke information of respective dictionary character patterns are arranged based on said input-stroke classification means and said rearrangement means.

21. A computer-readable medium having stored thereon computer-executable process steps, the computer-executable process steps comprising:

an inputting step to input a plurality of strokes which collectively form a character;

a classifying step to classify each stroke of the input strokes into one of a plurality of different types;

an extracting step to extract input strokes which are classified into one type;

a calculating step to calculate a value of analogy between the strokes which are classified as said type and stroke information of said type for a character stored in a dictionary;

a forming step to form an analogy matrix comprising calculated values of analogy as elements thereof;

a detecting step to detect a maximum matrix element in each of a plurality of columns or in each of a plurality of rows of the analogy matrix;

a designating step to designate the detected maximum matrix elements as maximum analogous elements;

a determining step to determine whether or not there is one maximum matrix element in each row or each column of the analogy matrix;

a selecting step to select a maximum matrix element so that only one maximum matrix element is present in each row or each column, in a case that there is more than one maximum matrix element in a row or column;

a detecting step to detect a maximum analogous character from a plurality of characters stored in the dictionary according to values of analogy between input strokes classified as a particular type and stroke information of the particular type for each of the plurality of characters stored in the dictionary; and an outputting step to output said maximum analogous character.

22. A computer-readable medium having stored thereon computer-executable process steps, the computer-executable process steps comprising:

an inputting step to input a plurality of strokes represented by a direction component and a coordinate position;

a rearranging step to rearrange the input strokes according to a sequence and a position of the input strokes;

a calculating step to calculate a one-to-one correspondence value of analogy between rearranged input strokes and stroke information stored in the dictionary;

a detecting step to detect a maximum analogous character according to the calculated values of analogy; and an outputting step to output said maximum analogous character.

* * * * *